(12) United States Patent
Ashdown (10) Patent No.: US 7,689,130 B2
(45) Date of Patent: Mar. 30, 2010

(54) METHOD AND APPARATUS FOR ILLUMINATION AND COMMUNICATION

(75) Inventor: Ian Ashdown, West Vancouver (CA)

(73) Assignee: Koninklijke Philips Electronics N.V., Eindhoven (NL)

( * ) Notice: Subject to any disclaimer, the term of this patent is extended or adjusted under 35 U.S.C. 154(b) by 537 days.

(21) Appl. No.: 11/339,983

(22) Filed: Jan. 25, 2006

(65) Prior Publication Data

US 2006/0239689 A1 Oct. 26, 2006

Related U.S. Application Data (60) Provisional application No. 60/647,093, filed on Jan. 25, 2005.

(51) Int. Cl.
H04B 10/00 (2006.01)

(52) U.S. Cl. .................. 398/172; 398/118; 398/127; 398/130; 398/140

(58) Field of Classification Search .............. 398/66, 398/76, 91, 118–131, 140, 172; 375/238, 375/295; 315/318
See application file for complete search history.

(56) References Cited

U.S. PATENT DOCUMENTS

| | | | | |
|---|---|---|---|---|
| 3,900,404 | A | | 8/1975 | Dachs .................. 250/199 |
| 5,206,857 | A | * | 4/1993 | Farleigh .................. 370/452 |
| 5,550,434 | A | | 8/1996 | King et al. .................. 315/160 |
| 5,633,629 | A | | 5/1997 | Hochstein |
| 5,635,915 | A | | 6/1997 | Gray .................. 340/825.57 |
| 5,657,145 | A | | 8/1997 | Smith .................. 359/181 |
| 5,801,877 | A | | 9/1998 | Yoneyama .................. 359/341 |
| 5,850,303 | A | * | 12/1998 | Yamamoto et al. .................. 398/91 |
| 5,896,211 | A | * | 4/1999 | Watanabe .................. 398/76 |
| 6,091,779 | A | | 7/2000 | Griessbach .................. 375/258 |
| 6,181,450 | B1 | * | 1/2001 | Dishman et al. .................. 398/122 |

(Continued)

FOREIGN PATENT DOCUMENTS

JP 60032443 2/1985

(Continued)

OTHER PUBLICATIONS

Buffaloe, T.K., et al., Fiat Lux: A Fluorescent Lamp Transceiver, IEEE, 0-7803-3704, pp. 1037-1041 (Feb. 1997).

(Continued)

*Primary Examiner*—Li Liu
(74) *Attorney, Agent, or Firm*—Robert V. Donahoe; Mark L. Beloborodov (57) ABSTRACT

The present invention provides a method and apparatus of using light-emitting elements for illumination as well as communication of data, wherein potential flicker due to sub-fusion frequency data correlations can be reduced compared to prior art techniques, while reducing redundancy in the data transmission. The intensity of the illumination from the light-emitting elements is controlled by a dimming signal such as a pulse width modulation (PWM) signal or a pulse code modulation (PCM) signal, for example. An amplitude-modulated data signal is then superimposed on the dimming signal for communication of data. The dimming signal thus acts as a carrier signal for the data signal. A sensing means is then used to receive the data signal by detecting all or part of the illumination from the light-emitting elements. The data signal can subsequently be extracted from the detected illumination.

14 Claims, 6 Drawing Sheets

U.S. PATENT DOCUMENTS

| | | | |
|---|---|---|---|
| 6,198,230 B1 | 3/2001 | Leeb et al. | |
| 6,400,482 B1 | 6/2002 | Leeb et al. | |
| 6,426,599 B1 | 7/2002 | Leeb | |
| 6,504,633 B1 | 1/2003 | Hororka et al. | 359/142 |
| 6,548,967 B1* | 4/2003 | Dowling et al. | 315/318 |
| 6,794,831 B2 | 9/2004 | Leeb et al. | |
| 6,879,640 B1* | 4/2005 | Agazzi | 375/295 |
| 7,006,768 B1* | 2/2006 | Franklin | 398/127 |
| 2002/0167701 A1* | 11/2002 | Hirata | 359/172 |
| 2003/0235246 A1* | 12/2003 | Dress et al. | 375/238 |
| 2005/0002673 A1* | 1/2005 | Okano et al. | 398/130 |
| 2005/0201752 A1* | 9/2005 | Bai | 398/30 |

FOREIGN PATENT DOCUMENTS

JP            01-122220            5/1989

OTHER PUBLICATIONS

Fan, K., et al., The Effect of Reflection on Indoor Visible-Light Communication System Utilizing White LEDs, IEEE, 0-7803-7442, pp. 611-615 (Aug. 2002).

IESNA Lighting Handbook, Ninth Edition, Illuminating Engineering Society of North America, New York, NY, 2000, p. 3-20.

Komine, T., et al., Integrated System of White LED Visible-Light Communication and Power-Line Communication, IEEE, 0-7803-7589, pp. 1762-1766 (2002).

Komine, T., et al., Integrated System of White LED Visible-Light Communication and Power-Line Communication, IEEE Trans. On Consumer Electronics 49(1):71- 79 (2003).

Žukauskas, A., et al., Introduction to Solid-State Lighting, Wiley-Interscience, New York, NY, p. 136 (2002).

* cited by examiner

METHOD AND APPARATUS FOR ILLUMINATION AND COMMUNICATION

This application claims priority to U.S. Application No. 60/647,093, filed Jan. 25, 2005.

FIELD OF THE INVENTION

The present invention pertains to the field of illumination and free-space optical communication, and more particularly, to the simultaneous use of a light source as an illumination device and a communication device.

BACKGROUND

Light sources can be used simultaneously for both general illumination and for free-space optical communication if their luminous flux output can be varied such that a human observer does not perceive a disturbing or otherwise undesirable flicker. Typically the luminous flux is modulated at frequencies above the "critical fusion frequency" (IESNA Lighting Handbook, Ninth Edition. Illuminating Engineering Society of North America, New York, N.Y., 2000, p. 3-20). This frequency is generally accepted to be about 60 Hertz for illumination applications based on electric lighting, but may be as high as about 150 Hertz for direct-view applications such as video displays.

Figure 1:
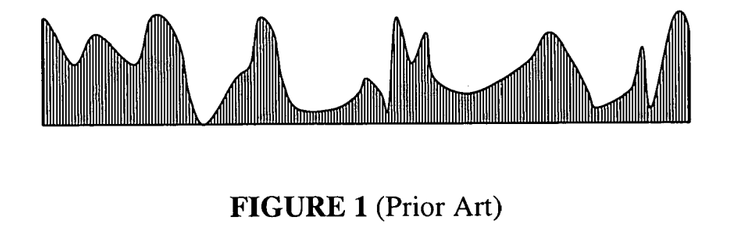
FIG. 1 illustrates a representation of an amplitude-modulated oscillating carrier signal according to the prior art.

A method and apparatus for free-space optical communications using visible light is disclosed by Dachs in U.S. Pat. No. 3,900,404. In particular, a 24 kHz oscillator that is amplitude-modulated with an audio signal drives the luminous flux output of a fluorescent lamp. A representation of such a drive signal is illustrated in FIG. 1. A similar apparatus disclosed by King et al. in U.S. Pat. No. 5,550,434 also incorporates amplitude modulation (AM) of an arc lamp with, for example, an audio signal.

In U.S. Pat. No. 5,657,145, Smith discloses a method and apparatus for pulse position modulation (PPM) of a mains-driven fluorescent lamp operated at 60 Hertz, wherein the drive current is asynchronously interrupted for 100 microsecond intervals to represent digital pulses. A complex encoding scheme is required to minimize transmission errors due to varying pulse amplitudes, especially at zero-crossing of the AC drive current.

In U.S. Pat. No. 5,635,915, Gray discloses a method and apparatus for phase shift key (PSK) modulation of fluorescent lamps operated at 60 Hertz to transmit low-bandwidth digital data. Similarly, in Japanese Patent Application No. 60-32443, Nakada discloses a method and apparatus for frequency shift key (FSK) modulation of fluorescent lamps.

In the publication, "*Fiat Lux: A Fluorescent Lamp Transceiver,*" *Applied Power Electronics Conference*, Atlanta, Ga., 1997, Buffaloe et al. describe a variant of pulse code modulation (PCM) for fluorescent lamps operated at 60 Hertz using a three-level coding scheme for low-bandwidth data transmission.

In U.S. Pat. No. 6,198,230, Leeb et al. disclose a method and apparatus for frequency modulation (FM) of various light sources, including fluorescent lamps operated by electronic ballasts and light-emitting diodes (LEDs). They further disclose the use of Manchester encoding for sideband FM modulation as a means for minimizing the low-frequency component of the modulation signal and thereby minimizing visible flicker. In addition, they disclose orthogonal bit coding and packet coding as two practical means of implementing multiple low-bandwidth digital information channels. In U.S. Pat. No. 6,504,633, a continuation of U.S. Pat. No. 6,198,230, they further disclose FSK and PCM techniques for the transmission of digital information.

Figure 2:
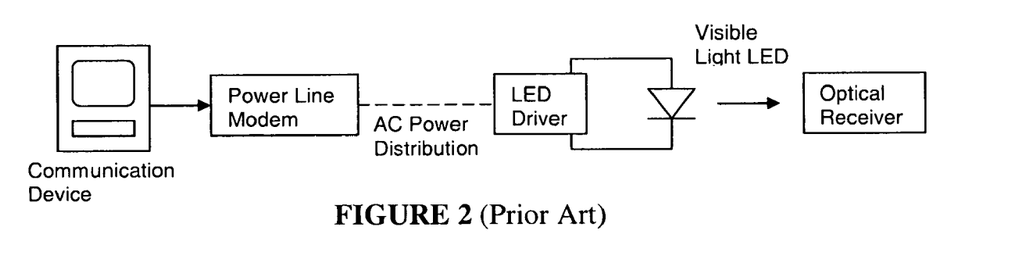
FIG. 2 illustrates a representation of a visible light LED communication system using a power-line modem according to the prior art.

In the publication, "*Integrated System of White LED Visible-Light Communication and Power-Line Communication,*" *IEEE Trans. on Consumer Electronics* 49(1):71-79, 2003, Komine et al. describe a visible-light communication system using a white-light LED luminaire comprising red, green, and blue LEDs whose DC power supply is amplitude-modulated with a 100 kbps data signal from a commercial power-line modem. A representation of this system is illustrated in FIG. 2. Such a system is possible since LEDs typically have switching times on the order of 100 nanoseconds compared to fluorescent lamps, whose phosphor coatings have decay times on the order of 10 milliseconds.

Figure 3:
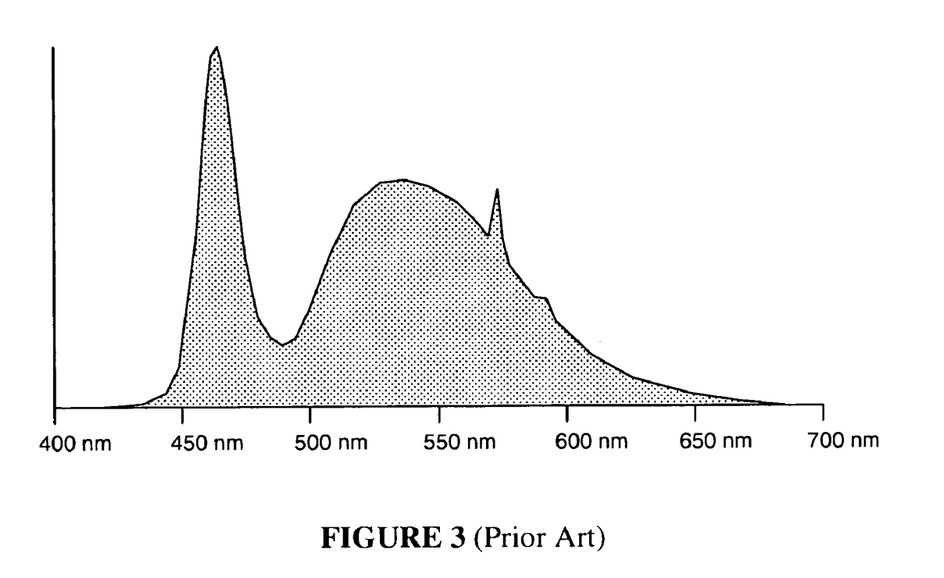
FIG. 3 illustrates the relative spectral power distribution of a phosphor-coated blue LED according to the prior art.

LED-based luminaires designed for general illumination typically employ one of two methods for generating "white" light. In the first method, a blue LED irradiates phosphors coated onto the light-emitting surface of the LED. These phosphors absorb a portion of the blue light and downconvert it to yellow and optionally red light. The combination of blue, yellow, and optionally red light produces white light. These types of LEDs are generically referred to as "phosphor-coated" LEDs (pcLEDs). The relative spectral power distribution of a blue pcLED is illustrated in FIG. 3. In a variant of the first method, an ultraviolet LED irradiates phosphors coated onto the light-emitting surface of the LED. These phosphors absorb a portion of the ultraviolet radiation and downconvert it to blue, green, and red light, the combination of which produces white light. In another variant of the first method, white light pcLEDs are combined with amber LEDs to produce white light with a variable correlated color temperature (CCT). In yet another variant of the first method, white pcLEDs are combined with red and green LEDs or blue and green LEDs to produce white light with a variable CCT, and to correct undesirable chromaticity shifts that may occur in the white light generated by the pcLEDs as their junction temperatures change in response to varying drive current or ambient temperature.

Figure 4:
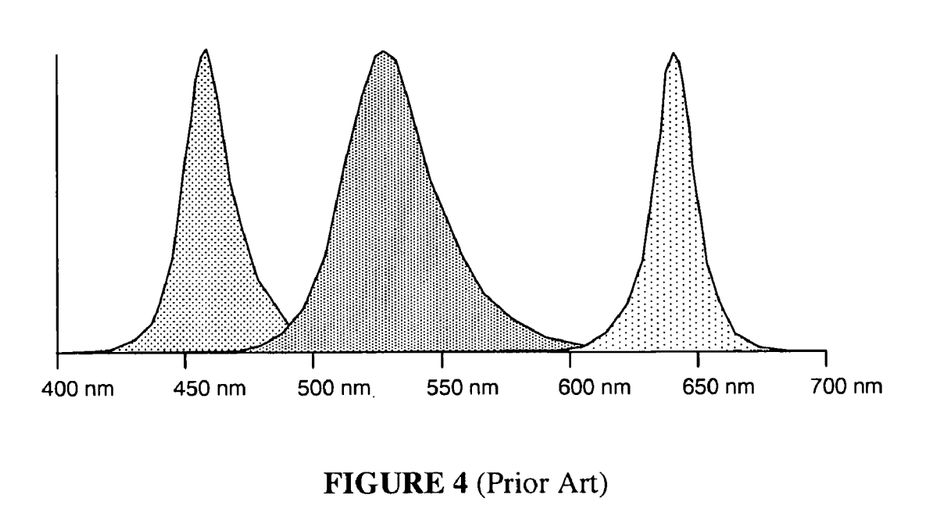
FIG. 4 illustrates the relative spectral power distribution of a multicolor LED assembly according to the prior art.

In the second method, colored light emitted by red, green, blue, and optionally amber LEDs is combined to produce white light. The relative spectral power distribution of a multicolour LED assembly is illustrated in FIG. 4.

As occurs with fluorescent lamp phosphors, phosphors utilized for pcLEDs typically have a time constant of 10 milliseconds or more. This makes it difficult to modulate the luminous intensity of the LEDs at data rates greater than a few hundred bits per second (bps) with reliable detection of the modulated white light.

Figure 5:
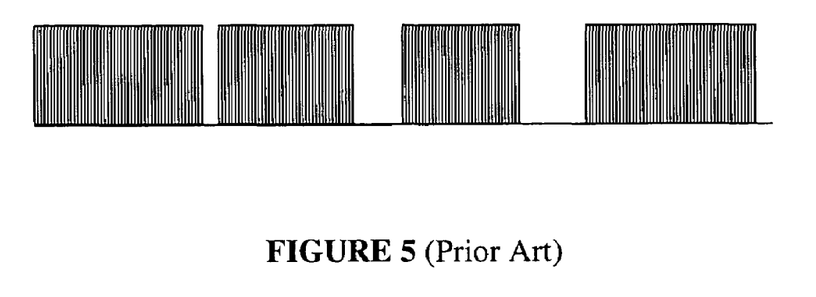
FIG. 5 illustrates a representation of pulse code modulation of a pulse width-modulated drive signal according to the prior art.

In U.S. Pat. No. 6,548,967, Dowling et al. disclose the use of a combination of PCM and pulse width modulation (PWM) for the transmission of digital information using high-flux LEDs. Given a minimum PWM frequency above the critical fusion frequency, the "ON" portion of each PWM cycle is replaced with a PCM pulse train. A representation of such a drive signal with pulse code modulation of a PWM signal is illustrated in FIG. 5, in which the pulse train comprises a portion of a digital data signal followed by the exclusive- or (ones complement) of that portion of the digital data signal, such that the temporal sum of the "ON" portion is equal to the duty cycle of the PWM cycle.

Figure 6:
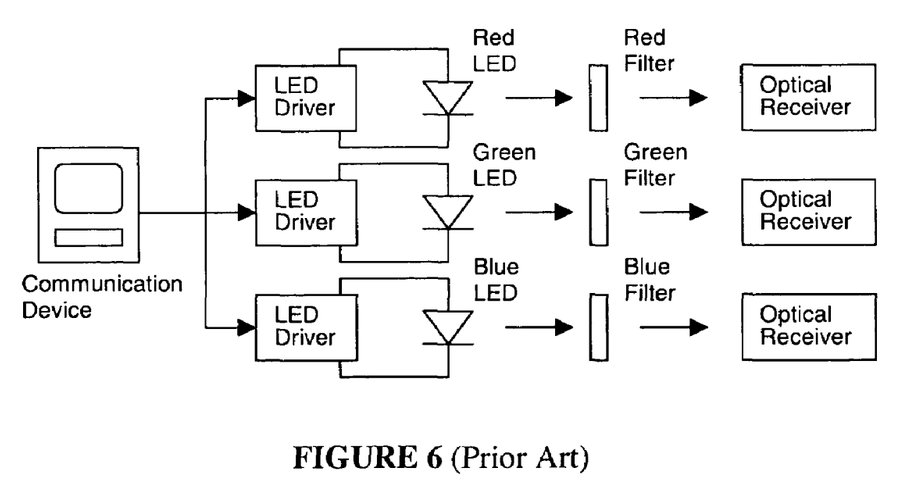
FIG. 6 illustrates a multiple channel visible light LED communication system according to the prior art.

In Japanese Patent Application No. 62-280225, Kawada et al. disclose the use of a plurality of light sources with different emission wavelengths, or colors, with an unspecified modulation method to implement a multiplicity of digital information channels, as illustrated in the representation of FIG. 6. A combination of red, green, and blue LEDs produce white light for general illumination, while color filters on the light-sensitive receivers minimize data channel crosstalk.

Visible light LEDs designed for general illumination applications can exhibit unique requirements when used for free-space optical communications. As noted by Leeb et al. in U.S. Pat. No. 6,198,230, it is necessary to modulate the LEDs in such a manner that the emitted visible light is not perceived to flicker as the temporal spectrum of the transmitted data changes. This is particularly important for burst communications as may occur for example in a lighting control network. The data channel is normally quiescent, however each lighting control command sent over the network produces a burst of data that may be perceived as a momentary flickering of the illumination level.

In the publication, "*Integrated System of White LED Visible-Light Communication and Power-Line Communication,*" *IEEE Trans. on Consumer Electronics* 49(1):71-79, 2003, Komine et al. demonstrate free-space optical communications using red, green, and blue LEDs whose combined luminous flux output produces white light. However, their design employs amplitude modulation of the LED drive current. As is known to those skilled in the art, and as disclosed in the publication, "*Introduction to Solid-State Lighting*", Wiley-Interscience, New York, N.Y., 2002, p. 136, by Zukauskas, A., M. S. Shur, and R. Caska, for example, AM is a less efficient means of controlling LED drive current than PWM. In addition, while the power line modem data format was undocumented, there is no discussion in the paper of how to limit low frequency harmonic content that can cause observable flicker.

In U.S. Pat. No. 6,548,967 Dowling et al. address the issue of flicker by using an encoding scheme that guarantees that the temporal spectrum of the transmitted data does not extend below the PWM frequency, which is typically 300 Hertz. They disclose PCM-data encoding to eliminate visual flicker as the PWM carrier signal is being modulated by ensuring that the average DC level of the transmitted data is zero for each PWM pulse. The penalty of this encoding is 100 percent redundancy in the data transmission, which is inefficient and effectively halves the potential data bandwidth of the optical transmitter. In U.S. Pat. No. 6,198,230 Leeb et al. disclose the use of Manchester phase encoding to minimize visual flicker, however, this has a 50 percent redundancy.

A further disadvantage of PWM for free-space optical communications is that it is cyclically discontinuous. As noted by Dowling et al. in U.S. Pat. No. 6,548,967, the PCM technique must include a memory buffer to store received data and control logic to reformat the data such that it can be transmitted in bursts within each PWM pulse. If the LEDs are designed to provide variable intensity illumination, the input data bandwidth must be further constrained such that it does not exceed the bandwidth of the optical transmitter when PWM is operated at its minimum duty cycle. In addition there is no consideration given to the possibility of communication channel crosstalk minimization or collision detection between two or more LED-based luminaires performing or attempting to perform simultaneous free-space optical transmission. Furthermore, it is difficult to design economical power supplies and LED drivers that can modulate high-flux LEDs at high data rates using PCM techniques without unacceptable electromagnetic interference (EMI), and while preventing output voltage variations due to high-frequency dynamic loads that may exceed the design limits of the LED drive electronics.

Another disadvantage of the technique as defined by Dowling et al. in U.S. Pat. No. 6,548,967 is that high-flux LEDs have die thermal constants of approximately one millisecond. If the PWM frequency is too low, the resultant thermal cycling of the LED die wire bonds may lead to stress fractures in the solder joints and whisker formation that cause premature failure of the LEDs as described in "*LED Lamp Thermal Properties*", *Application Brief A*04, Agilent Technologies, Inc., Palo Alto, Calif., 2001, for example. It may also encourage the formation and growth of dislocation defects in the LED die that contribute to premature lumen depreciation. In general, a PWM frequency of 10 kHz or greater is needed to avoid such problems.

The availability of two to four LED colors in an LED-based luminaire in principle can enable simultaneous free-space optical communication on as many channels with high bandwidths and minimal channel crosstalk. However, modulation methods currently used for fluorescent lamps and LEDs are not practical for LEDs whose intensity is controlled using PWM techniques.

In view of the above, there is a need for a general illumination system that can provide low-redundancy, high-bandwidth free-space optical communications between luminaires using multiple simultaneous communication channels with crosstalk reduction and collision detection.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a method and apparatus for illumination and communication. In accordance with an aspect of the present invention, there is provided an apparatus for illumination and communication of data, the apparatus comprising: one or more light-emitting elements; a control means for generating a carrier signal for controlling desired light output of the one or more light-emitting elements; a modulation means for generating a data signal for superposition on the carrier signal thereby forming a control signal for controlling light emission of the one or more light emitting elements; a sensing means for detecting at least a portion of the light emission; and means for extracting the data signal from the detected light emission.

In accordance with another aspect of the present invention there is provided a method for illumination and communication of data, the method comprising the steps of: generating a carrier signal for controlling desired light output of one or more light-emitting elements; generating a data signal; combining the carrier signal and the data signal thereby forming a control signal, the control signal for controlling the light emission of the one or more light-emitting elements; sensing at least a portion of the light emission; and extracting the data signal.

DETAILED DESCRIPTION OF THE INVENTION

Definitions

The term "light-emitting element" is used to define any device that emits radiation in any region or combination of regions of the electromagnetic spectrum for example, the visible region, infrared and/or ultraviolet region, when activated by applying a potential difference across it or passing a current through it, for example. Therefore a light-emitting element can have monochromatic, quasi-monochromatic polychromatic or broadband spectral emission characteristics. Examples of light-emitting elements include semiconductor, organic, or polymer/polymeric light-emitting diodes, optically pumped phosphor coated light-emitting diodes, optically pumped nano-crystal light-emitting diodes or any other similar light-emitting devices as would be readily understood by a worker skilled in the art. Furthermore, the term light-emitting element is used to define the specific device that emits the radiation, for example a LED die, and can equally be used to define a combination of the specific device that emits the radiation together with a housing or package within which the specific device or devices are placed.

As used herein, the term "about" refers to a +/−10% variation from the nominal value. It is to be understood that such a variation is always included in any given value provided herein, whether or not it is specifically referred to.

The terms "light," "lighting," "illumination," "radiation" and "color" are used interchangeably to define electromagnetic radiation of a particular frequency or range of frequencies in any region of the electromagnetic spectrum for example, the visible, infrared and ultraviolet regions, or any combination of regions of the electromagnetic spectrum.

Unless defined otherwise, all technical and scientific terms used herein have the same meaning as commonly understood by one of ordinary skill in the art to which this invention belongs.

The present invention provides a method and apparatus of using light-emitting elements for illumination as well as communication of data, wherein potential flicker due to sub-fusion frequency data correlations can be reduced compared to prior art techniques, while reducing redundancy in the data transmission. The intensity of the illumination from the light-emitting elements is controlled by a dimming signal such as a pulse width modulation (PWM) signal or a pulse code modulation (PCM) signal, for example. An amplitude-modulated data signal is then superimposed on the dimming signal for communication of data. The dimming signal thus acts as a carrier signal for the data signal. A sensing means is then used to receive the data signal by detecting all or part of the illumination from the light-emitting elements. The data signal can subsequently be extracted from the detected illumination.

Embodiments of the present invention enable the reduction of redundancy when encoding methods are required to reduce flicker in illumination from light-emitting elements used for communication. A reduced redundancy can effectively increase data bandwidth. Furthermore, amplitude modulation of a PWM signal, for example, allows the design and use of economical power supplies at high data rates with acceptable levels of electromagnetic interference (EMI), while limiting output voltage variations that may exceed the design limits of drive electronics associated with the one or more light-emitting elements. High data rates can allow high PWM frequencies to be achieved which can prevent adverse effects of thermal cycling.

The present invention can further reduce cross-talk occurring between various channels by using different colors of light-emitting elements for the transmission of data simultaneously along different channels. Color filters may be used on the sensing means to minimize data channel cross-talk.

In one embodiment of the present invention a continuous carrier signal can be provided, thereby eliminating the need for a memory buffer to store data received by the light-emitting elements and control logic to reformat the data.

Another embodiment of the present invention further enables the use of phosphor-coated light-emitting elements for illumination as well as communication by the use of narrowband spectral filters whose center wavelength approximately matches the center wavelength of a particular band of wavelengths being detected to limit the spectral response of the sensing means.

Figure 10:
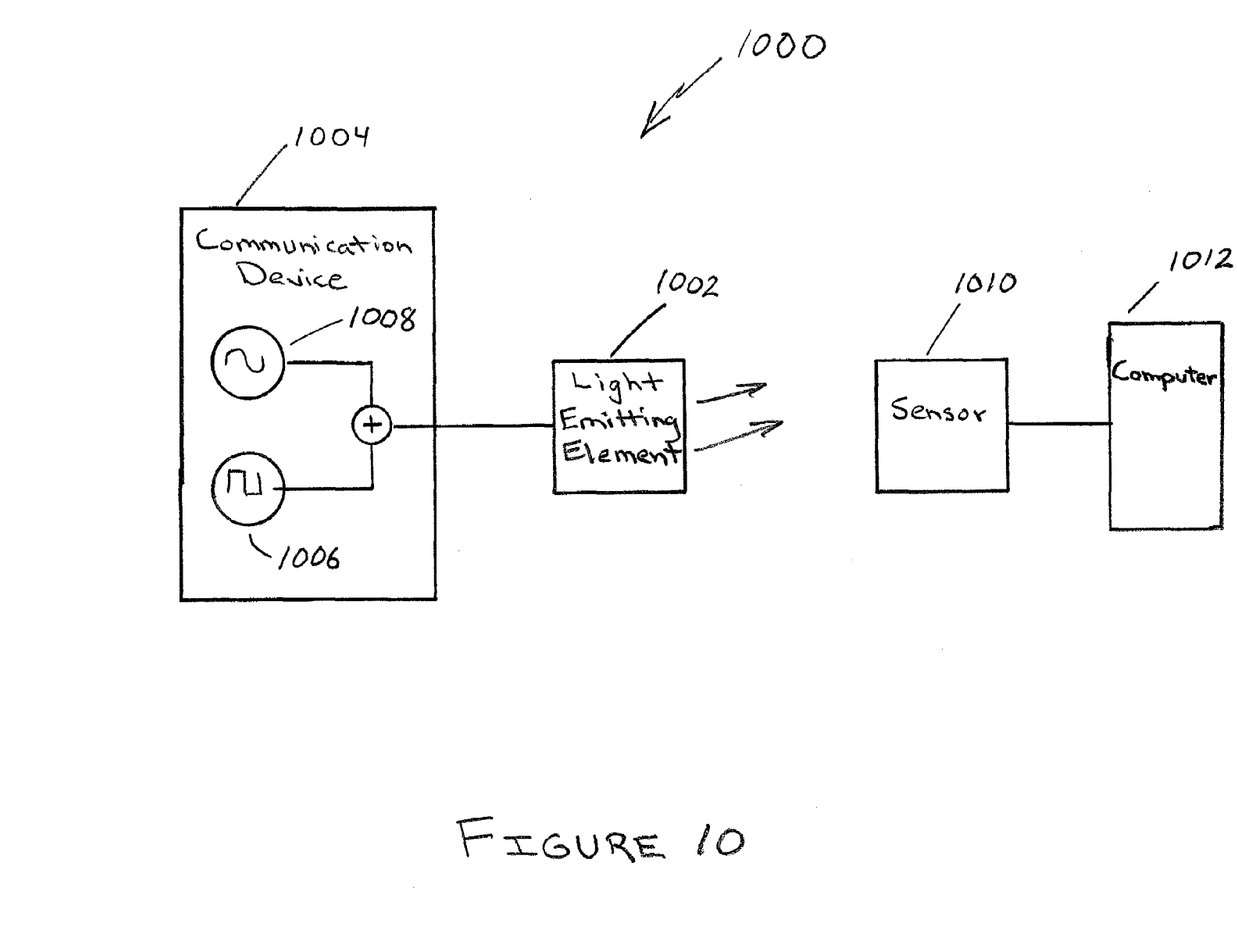
FIG. 10 illustrates an apparatus in accordance with one embodiment of the invention.

FIG. 10 illustrates an apparatus 1000 for both illumination and a communication of data. According to one embodiment, the apparatus includes one or more light-emitting elements 1002 and a communication device 1004 that can include a carrier signal generator 1006 for controlling desired light intensity of the one or more light-emitting elements and a data signal generator 1008 for generation of a data signal for superposition on the carrier signal where the superposition provides a control signal for controlling light emission of the one or more light emitting elements 1002. The apparatus can also include a sensor 1010 configured to detect at least a portion of the light emission and a computer 1012 for extracting the data signal from the detected light emission.

Carrier Signal

The carrier signal or dimming signal is typically a PWM signal, which is an efficient intensity control method commonly used for light-emitting elements such as light-emitting diodes (LEDs). The dimming signal may also be a PCM signal, or any other such signal for dimming control of the light-emitting elements as would be readily understood by a worker skilled in the art.

Sensing Means

The sensing means can be an optical sensor that can detect all the frequencies of light emitted by the light-emitting elements or portions thereof, or may comprise spectrally selective filters to detect particular frequencies. For example, if an array of blue, red and green light-emitting elements are used for illumination, and a data signal can be superimposed on the light illuminated by the red light-emitting elements only, the sensing means may comprise a spectrally selective filter to allow the detection of red light only. The sensing means may be a photodiode, or any other radiation sensitive detector as would be readily understood by a worker skilled in the art.

Extraction of the data signal from the collected illumination from the one or more light-emitting elements can be performed by a computing means that is integrated into the sensing means or connected thereto. A worker skilled in the art would readily understand how to implement an extraction method for determination of the data signal, wherein this extraction method is dependent on the method by which the data signal is formed and superimposed on the carrier signal.

Amplitude Modulation of Carrier Signal

Superimposing an amplitude-modulated data signal on a PWM carrier signal, for example, can significantly reduce potential visual flicker compared to PCM of a PWM signal, for example, since amplitude modulation (AM) of a PWM signal does not result in frequency data correlations below the critical fusion frequency, as can be the case of PCM of a PWM signal.

Figure 7:
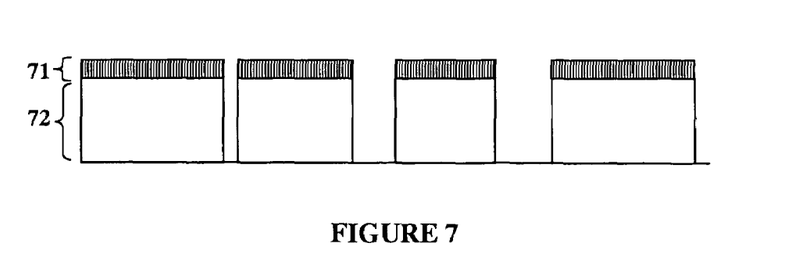
FIG. 7 illustrates an amplitude modulated PWM carrier signal according to one embodiment of the present invention.

A typical LED-based luminaire, for example, can generate tens of watts of optical power while typical photodetectors, for example, silicon photo diodes, can have sensitivities of less than one milliwatt. Thus, peak amplitude modulation of less than about one percent can be adequate for most lighting and communication applications. In one embodiment of the present invention, the data signal 71 is an amplitude-modulated signal, which is superimposed on the pulses of a PWM carrier signal 72 for control of an LED-based luminaire as illustrated in FIG. 7.

Continuous Carrier Signal

One embodiment of the present invention can eliminate the need for a memory buffer to store data received by the light-emitting elements and control logic to reformat the data by providing a continuous carrier signal. A continuous carrier signal can be achieved by using more than one light-emitting element and phase shifting the dimming signals that control individual light-emitting elements or groups of light-emitting elements such that one or more light-emitting elements are always energized if the sum of their duty cycles equals or exceeds the dimming signal period. The light-emitting elements may provide illumination of the same color, or wavelength, or different colors, or wavelengths, as would be readily understood by a worker skilled in the art. For example, a plurality of red light-emitting elements can be used for communication where the dimming signals for individual light-emitting elements, or groups of light-emitting elements, are phase shifted to ensure a continuous carrier signal, or a white-light luminaire with red, green, blue, and amber light-emitting elements could be dimmed to about 25 percent of full intensity while maintaining a continuous carrier signal.

In one embodiment, a continuous carrier signal can be amplitude-modulated, frequency-modulated, or phase-modulated with a plurality of frequencies or mutually orthogonal digital codes, as would be readily understood by a worker skilled in the art. Each of these frequencies can be further modulated using one of many known modulation methods, including amplitude modulation (AM), frequency modulation (FM), frequency shift key (FSK) modulation, pulse code modulation (PCM), pulse point modulation (PPM), phase shift key (PSK) modulation, amplitude shift keying (ASK), amplitude phase keying (APK), quadrature amplitude modulation (QAM), discrete multitone modulation (DMM), code division multiple access (CDMA), and differential chaos shift keying (DCSK) methods, or any other method as would be readily understood, and wherein each frequency or mutually orthogonal code represents an independent data communication channel. Detection of each data channel can be accomplished using known demodulation techniques, including but not limited to high-Q filters, phase-locked loops, and digital correlation receivers.

In another embodiment, when a continuous carrier signal is enabled, the input data bandwidth may be constrained by the bandwidth of the light-emitting elements only. Thus, where the light-emitting elements are designed to produce variable intensity illumination, the input data is not constrained by the minimum duty cycle of the PWM cycle, for example.

Figure 8:
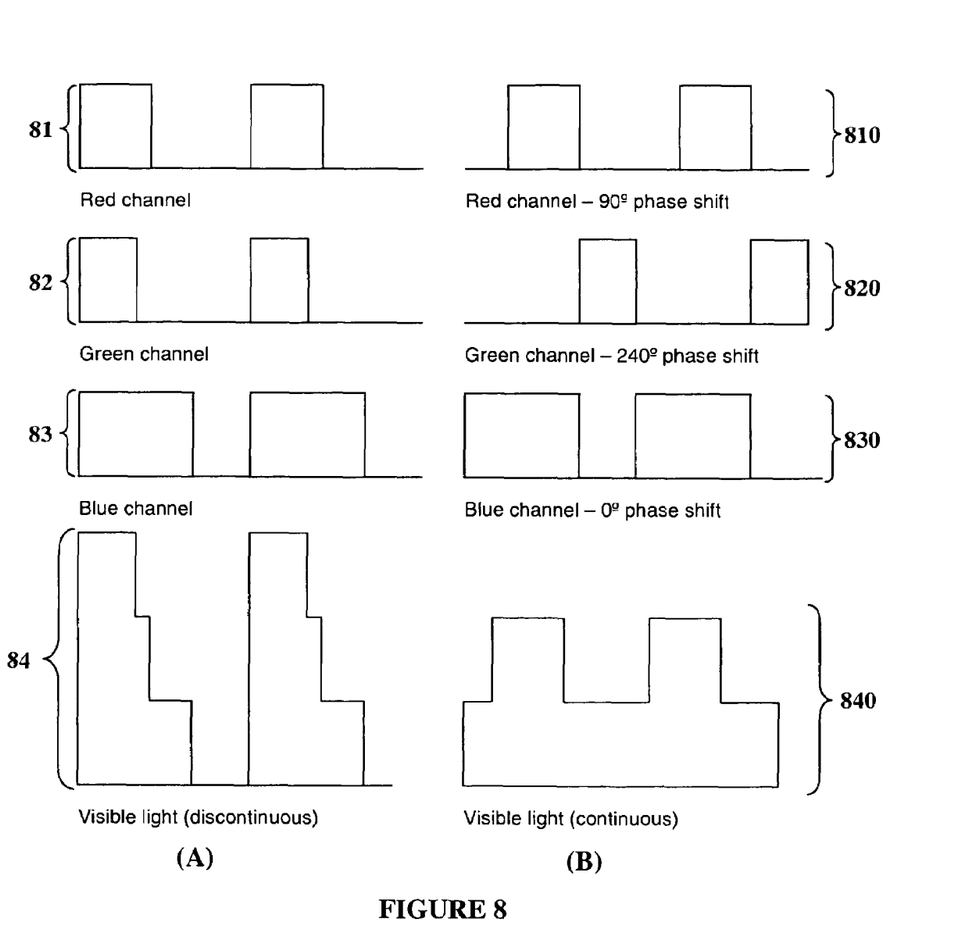
FIG. 8A illustrates multiple pulse width-modulated carrier signals forming a discontinuous carrier transmission according to one embodiment of the present invention.
FIG. 8B illustrates relative phase shifting of multiple pulse width-modulated carrier signals forming a continuous carrier transmission according to one embodiment of the present invention.

In one embodiment of the present invention, the carrier signal is a continuous PWM signal obtained by using multiple colors of light-emitting elements and phase shifting the PWM signals for each color such that one or more light-emitting element colors is always energized. FIG. 8A illustrates a red channel PWM signal 81, a green channel PWM signal 82, and a blue channel PWM signal 83, and a resulting discontinuous visible light carrier signal 84. If each signal 81, 82 and 83 is phase shifted by 90°, 240° and 0°, for example, to produce red channel signal 810, green channel signal 820 and blue channel signal 830, respectively, a continuous visible light carrier signal 840 can be obtained as illustrated in FIG. 8B.

To avoid discontinuous modes of operation as described in FIG. 8a, another embodiment of the present invention can cooperatively or independently reduce one or more of the LED drive current amplitudes when the light-emitting element intensities are dimmed below a predetermined threshold, for example, about 50 percent of the nominal or maximum value of an light-emitting element's intensity.

Figure 9:
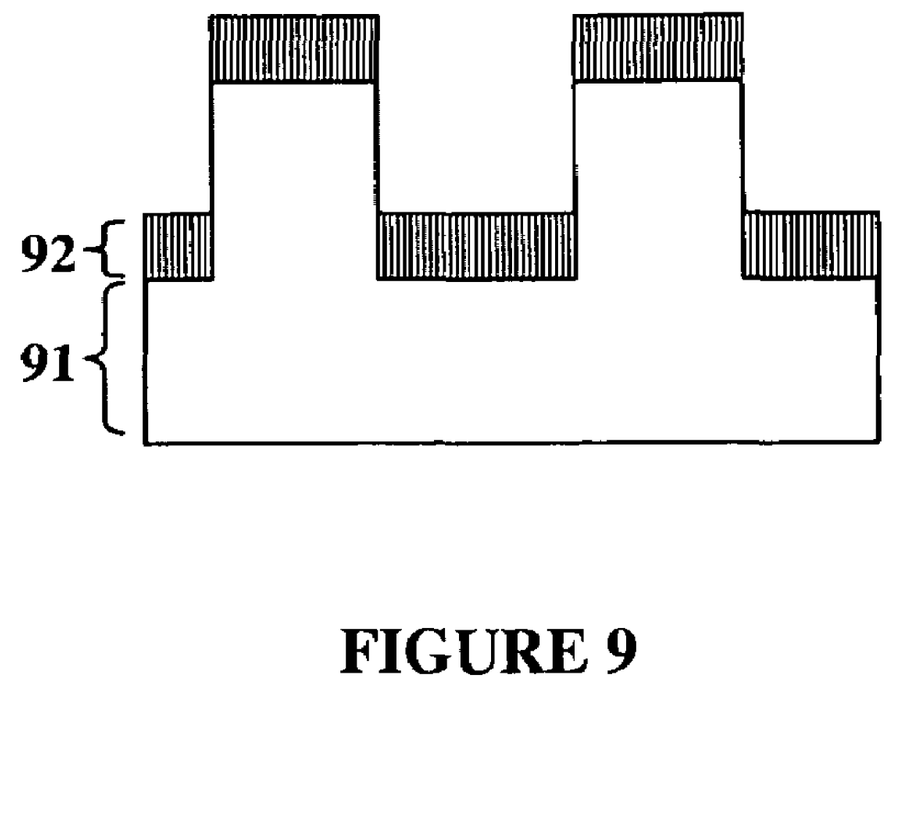
FIG. 9 illustrates amplitude modulation of a continuous carrier signal according to one embodiment of the present invention.

Input data can be superimposed on the continuous carrier signal using various methods. For example, in one embodiment of the present invention, the data can be used to simultaneously amplitude modulate each light-emitting element color as illustrated in FIG. 9, wherein amplitude-modulated data signal 92 is superimposed on carrier signal 91. A sensor with a broadband spectral response that responds equally to each color can then continuously receive the transmitted data. As would be readily understood, the input data can be similarly superimposed on a discontinuous carrier signal.

The amplitude modulation for each color can optionally be controlled during the duty cycle such that the AC-coupled data signal received by the optical sensor has constant amplitude. An advantage of this method of modulating each light-emitting element color is that the amplitude modulation can be automatically adjusted to dynamic or static environmental conditions to maintain optimal signal integrity. For example, the majority of the light from an light-emitting element-based luminaire received by a broadband sensor may be reflected from a strongly coloured surface, such as, for example, a red wall. In this situation the amplitude modulation of the green and blue LEDs could be increased to compensate for absorption of green and blue light by the red wall, which would result in weaker signals for these color channels. As would be readily understood, the input data can be similarly superimposed on a discontinuous carrier signal.

In one embodiment of the present invention, an light-emitting element-based luminaire may provide supplemental illumination for an office space with daylight illumination. As the amount of solar insolation increases, the luminaire intensity can be decreased so as maintain constant illumination of the work surface. Correspondingly, the amplitude modulation must be increased to maintain a constant AC-coupled data signal.

Encoding

As the amplitude modulation is increased to maintain a constant AC-coupled data signal, it may be desirable to encode the input data such that it maintains an average DC level of zero. In one embodiment of the present invention, 4B/5B encoding is used to reduce the effects of flicker. 4B/5B encoding, as indicated in the publication "IEEE Standard for Carrier Sense Multiple Access with Collision Detection (CSMA/CD) Access Method and Physical Layer Specifications, IEEE, Piscataway, N.J., 2000," provides a signal transition every two bits and therefore has a redundancy of only 25 percent, which is significantly less than that achievable by encoding methods currently used in the prior art.

In this embodiment, the process of 4B/5B encoding of a binary bit stream comprises of first converting each 4-bit nybble into a 5-bit symbol according to Table 1. The resulting 5-bit code stream is then further encoded using NRZI (non-return-to-zero-inverted) encoding, wherein the system starts in an idle (high) state and the encoded state is toggled at every high-to-low transition. Further frame formatting of the encoded data may be applied as defined, for example, in ANSI X3T9.5 for Fiber Distributed Data Interface (FDDI) and IEEE 802.3 for 100BaseTX Ethernet.

TABLE 1

| Nybble | Symbol | Hex |
|---|---|---|
| 0000 | 11110 | 0x16 |
| 0001 | 01001 | 0x09 |
| 0010 | 10100 | 0x14 |
| 0011 | 10101 | 0x15 |
| 0100 | 01010 | 0x0A |
| 0101 | 01011 | 0x0B |
| 0110 | 01110 | 0x0E |
| 0111 | 01111 | 0x0F |
| 1000 | 10010 | 0x12 |
| 1001 | 10011 | 0x13 |
| 1010 | 10110 | 0x16 |
| 1011 | 10111 | 0x17 |
| 1100 | 11010 | 0x1A |
| 1101 | 11011 | 0x1B |
| 1110 | 11100 | 0x1C |
| 1111 | 11101 | 0x1D |

In another embodiment, data encoding methods, including 5B/6B, 8B/6T, 8B/10B, and MLT-3, can be used to provide an average DC level for the transmitted data, wherein the digitally encoded signal is superimposed as a binary or multi-level amplitude modulation of the continuous carrier signal. As would be readily understood by a worker skilled in the art, any of the above mentioned encoding techniques may also be applied to other methods of illumination and communication to reduce redundancy.

In one embodiment, error correction and collision detection methods may also be implemented as layers of the Open Systems Interconnect (OSI) network model, as would be readily understood by a worker skilled in the art. The use of light-emitting elements for free-space optical communications is therefore representative of Layer 1, Physical Layer.

Phosphor-Coated Light-Emitting Elements

One embodiment of the present invention enables the use of phosphor-coated light-emitting elements for illumination as well as communication by use of narrowband spectral filters whose center wavelength approximately matches the center wavelength of a particular band of wavelengths being detected to limit the spectral response of the sensing means. As described previously, phosphors utilized for pcLEDs, for example, have a time constant of approximately 10 milliseconds or more, which makes it difficult to modulate the luminous intensity of the LEDs at data rates greater than a few hundred bits per second (bps) with reliable detection of the modulated light. The LED itself however may be modulated at bit rates up to its switching time of for example about 100 nanoseconds for blue or ultraviolet LEDs. The phosphor typically does not absorb all the radiation generated by the LED. For example, with blue pcLEDs the phosphors absorb only a portion of the emitted light and with ultraviolet pcLEDs the phosphors absorb most but not all of the emitted radiation. Furthermore, the full width half maximum (FWHM) spectral bandwidth of blue and ultraviolet LEDs is about 15 nm to 40 nm. Therefore by using a spectrally selective filter on the sensing means, such as a silicon diode photodetector or other optical sensor, the radiation emitted by the LEDs that is not absorbed by the phosphor can be detected, and since the switching times of the LEDs can be small, large data communication rates can be achieved.

In one embodiment of the present invention, blue and/or ultraviolet pcLEDs can be used for illumination and high bandwidth data transmission with data rates approaching about 10 megabits per second (Mbps). In another embodiment of the present invention, white light pcLEDs combined with amber LEDs to produce white light with a variable correlated color temperature (CCT), can be modulated at bit rates up to their switching times of about 100 nanoseconds, and narrowband spectral filters may be employed to reject ambient light due to the pcLEDs and other light sources. In another embodiment, pcLEDs are combined with red and green LEDs or blue and green LEDs to produce white light with a variable CCT, and to correct undesirable chromaticity shifts that may occur in the white light generated by the pcLEDs as their junction temperatures change in response to varying drive current or ambient temperature. Similarly, the pcLEDs can be modulated at bit rates up to their switching times of about 100 nanoseconds, and narrowband spectral filters may be employed to reject ambient light due to the pcLEDs and other light sources.

In another embodiment, blue and/or ultraviolet pcLEDs with quantum dot phosphors, such as those manufactured by Evident Technologies of Troy, N.Y., with narrow emission FWHMs on the order of about 30 to 40 nm and extinction times on the order of about 10 nanoseconds, can be used for illumination and high bandwidth data transmission with data rates approaching about 10 Mbps. A particular advantage of quantum dot phosphors is that their peak emission wavelength can be tuned across the visible spectrum. Thus, a multiplicity of quantum dot pcLEDs can provide the basis for ten or more simultaneous communication channels.

The embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An apparatus comprising:
   a) a plurality of light-emitting elements configured to emit a variable intensity visible light for both general illumination and a communication of data;
   b) a control means for generating a continuous carrier signal for controlling a luminous flux output of the plurality of light-emitting elements, the carrier signal comprising a plurality of phase-shifted dimming signals for the plurality of light-emitting elements, respectively, each of the plurality of dimming signals having a duty cycle for operation of an associated light-emitting element included in the plurality of light emitting elements;
   c) a modulation means for generating a data signal including encoded data for superposition on the carrier signal thereby forming a control signal for further controlling the luminous flux output of the plurality of light emitting elements in a manner that does not result in a visible flicker, the control signal formed by employing a peak amplitude modulation of substantially less than 100%, wherein the control signal is formed with the encoded data unconstrained by a minimum duty cycle of at least one of the plurality of dimming signals;

d) a sensing means for detecting at least a portion of the luminous flux output; and e) means for extracting the data signal from the detected luminous flux output.

2. The apparatus according to claim 1 wherein the carrier signal is a pulse width modulated or a pulse code modulated signal.

3. The apparatus according to claim 1, wherein the data signal is a peak amplitude modulated signal.

4. The apparatus according to claim 3 wherein the encoded data is encoded in a manner that is less than fully redundant.

5. The apparatus according to claim 1 wherein the continuous carrier signal is amplitude modulated by the data signal.

6. The apparatus according to claim 1 wherein the sensing means comprises an optical filter.

7. The apparatus according to claim 1 wherein the control signal is formed by employing a peak amplitude modulation of less than about one percent.

8. A method for providing visible light for both general illumination and a communication of data, the method comprising the steps of:

a) generating a continuous carrier signal for controlling a luminous flux output of a plurality of light-emitting elements, the carrier signal comprising a plurality of phase-shifted dimming signals for the plurality of light emitting elements, respectively, each of the plurality of dimming signals having a duty cycle for operation of an associated light-emitting element included in the plurality of light emitting elements;

b) generating a data signal including encoded data;

c) combining the carrier signal and the data signal thereby forming a control signal by employing a peak amplitude modulation of substantially less than 100%, the control signal for further controlling the luminous flux output of the plurality of light emitting elements in a manner that does not result in a visible flicker and forming the control signal with the encoded data unconstrained by a minimum duty cycle of at least one of the plurality of dimming signals;

d) sensing at least a portion of the luminous flux output; and e) extracting the data signal from the sensed luminous flux output.

9. The method according to claim 8 wherein the carrier signal is a pulse width modulated or a pulse code modulated signal.

10. The method according to claim 9, wherein the data signal is a peak amplitude modulated signal.

11. The method according to claim 10 wherein the continuous carrier signal is amplitude modulated by the data signal.

12. The method according to claim 10 wherein the control signal is encoded.

13. The method according to claim 9 further including a step of filtering at least a portion of the luminous flux output with an optical filter, prior to the step of sensing at least a portion of the luminous flux output.

14. The method according to claim 8 wherein the step of combining includes a step of employing a peak amplitude modulation of less than about one percent.

* * * * *